United States Patent [19]
Sukonick

[11] Patent Number: 5,295,551
[45] Date of Patent: Mar. 22, 1994

[54] SYSTEM FOR THE COOPERATIVE DRIVING OF TWO OR MORE VEHICLES

[76] Inventor: Josef Sukonick, 14774 Live Oak La., Saratoga, Calif. 95070

[21] Appl. No.: 569,742

[22] Filed: Aug. 21, 1990

Related U.S. Application Data

[63] Continuation of Ser. No. 390,485, Jul. 31, 1989, abandoned, which is a continuation of Ser. No. 279,322, Dec. 1, 1988, abandoned, which is a continuation of Ser. No. 836,834, Mar. 6, 1986, abandoned.

[51] Int. Cl.$^5$ .............................................. B62D 13/00
[52] U.S. Cl. ..................................... 180/167; 364/461
[58] Field of Search ................ 180/169, 167; 364/461

[56] References Cited

U.S. PATENT DOCUMENTS

| | | | |
|---|---|---|---|
| 2,188,293 | 1/1940 | Williams | 180/167 |
| 3,442,347 | 5/1969 | Hodgson et al. | 180/169 |
| 3,790,780 | 2/1974 | Helmcke | 340/903 |
| 4,333,147 | 6/1982 | Regueiro et al. | 364/436 |
| 4,578,665 | 3/1986 | Yang | 364/426 |

FOREIGN PATENT DOCUMENTS

| | | | |
|---|---|---|---|
| 2404884 | 8/1975 | Fed. Rep. of Germany | 180/169 |
| 0198172 | 12/1982 | Japan | 180/167 |

OTHER PUBLICATIONS

*Highway Research Record*, No. 344, Vehicle Characteristics (3 reports), Highway Research Board, Division of Engineering, National Research Counsil, Nat. Academy of Sciences, Nat. Academy of Engineering, 1971.
*Control in Transportation Systems*, Proceedings of 4th IFAC/IFIP/IFORS Conf., Baden-Baden, W. Germany, Apr. 20-22, 1983, Edited by D. Klamt & F. Lauber Pergamon Press, "A Velocity-Adaptive, Microprocessor-Based, Vehicle Lateral Controller" S. S. Murphy & R. E. Fenton.
*Control in Transportation Systems*, Proceedings of 4th IFAC/IFIP/IFORS Conf., Baden-Baden, W. Ger., Apr. 20-22, 1983, Ed. D. Klamt & F. Lauber, Pergamon Press, "On Safe Longitudinal Control of Ground Transportation Vehicles", J. Glimm.
*IEEE Transactions on Automatic Control*, vol. AC-22, No. 4, Aug. 1977 "On the Identification of Vehicle Longitudinal Dynamics", G. M. Takasaki & R. E. Fenton.
*IEEE Transactions of Automatic Control*, vol. AC-21, No. 3, Jun. 1976, "On the Steering of Automated Vehicles: Theory and Experiment", R. E. Fenton, G. C. Melocik & K. W. Olson.
*IEEE Transactions on Vehicular Technology*, vol. VT-34, No. 4, Nov., 1985 "On the Design of a Vehicle Longitudinal Controller," A. S. Hauksdottir & R. E. Fenton.
*Automated Guided Vehicles*, Dr.-Ing Thomas Muller, IFS (Publications), Ltd., UK, 1983.

*Primary Examiner*—David M. Mitchell
*Attorney, Agent, or Firm*—Spensley Horn Jubas & Lubitz

[57] ABSTRACT

The present invention teaches a system of cooperative driving for use in traffic mitigation or towing, in which two or more non-mechanically connected vehicles are identically equipped with automatic driving controls, which cooperate with sensors and communication devices so that the vehicles are effectively driven by the driver in the leading vehicle.

9 Claims, 3 Drawing Sheets

SYSTEM FOR THE COOPERATIVE DRIVING OF TWO OR MORE VEHICLES

This application is a continuation of application Ser. No. 07/390,485 filed on Jul. 31, 1989, now abandoned, which is a continuation of application Ser. No. 07/279,322 filed on Dec. 1, 1988 and now abandoned, which is a continuation of application Ser. No. 06/836,834 filed on Mar. 6, 1986 and now abandoned.

BACKGROUND OF THE INVENTION

This invention relates to a new system for traffic mitigation. More specifically, it relates to a system for the cooperative driving between vehicles whereby the flow of automobiles on freeways and city streets at peak hours is substantially increased.

Heavy rush hour traffic is considered an urgent unsolved problem in all major metropolitan areas of the United States. For example, planners in Santa Clara County, Calif., 50 miles south of San Francisco, have declared traffic congestion to be the region's number one public problem. The final bits and pieces of the freeway systems planned and begun in the 50's and 60's are now being completed. Major new highway construction is dubious since the public mood does not support it. Each mile and each interchange is fought by no-growth proponents. Public transit systems are recognized to have only marginal value in areas of low population density, such as Santa Clara County. Even the staunchest advocates of public transit do not think it can replace the private automobile in low density areas.

With major freeway expansions and the replacement of the car by public transit being unlikely, traffic congestion grows worse every year. As a result, there have been several attempts to make the automobile more efficient in heavy traffic thereby allowing already existing freeways and city streets to handle rush hour traffic more easily.

One such attempt is the idea of automatically guided vehicles, which has spawned numerous studies and approaches. Research has proceeded as far as a working prototype of a test track with suitable vehicles for an "automated highway". Typically such vehicles have onboard the following:

1) longitudinal control means for acceleration, speed maintenance, and braking,
2) lateral control means for steering, and
3) communications sensor and logic means for receiving collision-avoidance information from onboard or remote sensors, e.g., radar; positioning information from a remote source, e.g., a wire conductor buried in the roadway as a guide; and operating information from a remote computer or remote human operator, e.g., radiocontrol.

The information received and interpreted by the communications sensor and logic means is operatively connected to the lateral and longitudinal control means so that the vehicle safely and effectively moves along the roadway. In other words, the car goes, stops and steers in response to the data received. Numerous articles have been published on such automated highway systems and many patents have been issued on its variations.

Despite the promise of the automated highway and the urgency of its need, the U.S. Department of Transportation stopped funding of automated highway demonstration projects in 1980. Despair over its complexity and high cost has eroded the public desire to fund experiments in this area.

In West Germany and Japan currently funded demonstrations are limited to the less ambitious "automated route guidance," where the driver retains operating control over his/her vehicle. Automated route guidance means that a vehicle's operator can request and get guidance from a central computer about the best route to take from point A to point B. The computer knows the roads, the normal daily traffic patterns, and perhaps the real time situation with respect to traffic accidents and construction tie-ups. The human operator can then read and follow the computer's suggested directions which are communicated to a display terminal in the vehicle. By directing a driver to less traveled routes, the automated route guidance system is able to make more complete use of an area's total network of roads and highways. The use of such a system, however, is limited to regions which have several roadways between points A and B. In other words, there can be no redirection of the vehicle if there is only one roadway.

Another variation of this operator-controlled traffic mitigation system is an automated control system for traffic lights, currently in use in Los Angeles. Under the Los Angeles system, a central computer automatically controls intersection lights in response to actual traffic patterns. This system has had success in relieving traffic congestion during the Olympics. The advantage of this system is limited primarily to preventing gridlock, a traffic condition experienced daily in New York City, where traffic from all directions is stopped at an intersection for extremely lengthy periods. (The system is able to prevent gridlock by anticipating the ingress and egress flow rate of vehicles into and out of an intersection. By appropriately controlling lights at that intersection, the computer is able to balance the two flow rates so that no substantial back-up occurs.) The automated traffic light control system, though a practical tool for traffic intersection control, is inapplicable in solving the problem of getting more cars on a road between A and B.

Some experiments at traffic mitigation have been made with totally self-contained robot-guided vehicles, but so far, little promise has been shown. One such vehicle was equipped with a TV camera to "see" ahead a short stretch of road while driving itself slowly down the road. In that case, the robot vehicle tried to drive itself up a roadside tree. Technicians later explained that the sun's angle had caused the tree shadow to be unexpectedly sharp. The programmers have promised that next year's model will know more about shadows. I believe robots are decades away from being acceptable drivers.

Other prior art systems, in obliquely dealing with the problem of traffic mitigation, have suggested methods of automatically maintaining fixed close distances between two cars, thereby increasing the potential carrying capacity of a roadway. For example, Ayotte, U.S. Pat. No. 4,119,166, teaches a dual vehicle operating system whereby a lead vehicle is physically connected to a trailing vehicle by a zeroforce mechanical connecting link and signal wires. Mechanical transducers in the connecting link and pedal transducers in the lead car provide information via signal wires of the lead vehicle's steering, braking, and acceleration to an electronic control in the trailing vehicle that controls the trailing vehicle's throttle, brakes and steering. In this way, the trailing vehicle mimics the lead vehicle.

Such systems, however, suffer from the obvious disadvantage of requiring a physical hookup. The requirement of a hookup destroys most of the system's usefulness in dealing with the problem of traffic mitigation. The extra time and steps required to both prearrange for a car to be hooked up and to physically hook up the mechanical connection presents a nearly insurmountable barrier to the general and popular usage of this prior art system. Like car pools, this type of system will most likely die for lack of interest.

Reid, U.S. Pat. No. 3,011,580, also teaches an automatic vehicle control system which attempts to accomplish a similar result of closely spaced vehicles on a roadway. In contrast to Ayotte, Reid teaches a system where the steering, braking, and acceleration of a trailing vehicle is controlled by a leading vehicle so as to maintain a predetermined separation between the two vehicles without the use of a physical connecting means. Reid accomplishes this purpose by employing a pick up assembly on the trailing vehicle which detects infrared radiation from the two tail lights of the leading vehicle. The two tail lights and the pick up assembly, which is centered at the front of the trailing vehicle, define three points of a triangle. The angle subtended by the line between the two tail lights is directly proportional to the distance between the two vehicles. To maintain a fixed distance between the two vehicles, Reid controls the trailing vehicle to maintain a constant subtended angle.

One major disadvantage of this type of system is its inability to compensate for differing vehicular performance characteristics of the two vehicles. To take an extreme example, such a system may be dangerously inoperable if a semitrailer is trailing a high performance sports car. In that case, if the sports car either accelerates quickly or makes a sharp turn, the semitrailer with its poor acceleration characteristics and poor turning radius may be unable to follow the sports car, and in its attempt to do so, may overturn.

Another major disadvantage of this type of system is its failure to provide methods of use during actual roadway operation. For example, there is no provision for a vehicle operator to spontaneously engage in this type of an automatic vehicle control system while on the road. Consequently, this type of system appears to similarly require drivers to prearrange getting their vehicles together In addition, there is no provision for vehicles in this system to voluntarily disengage, thereby limiting the trailing operator's driving freedom and the widespread usefulness of this system.

An objective of the present invention is to provide a new system for the cooperative driving of two or more vehicles which minimizes the disadvantages of the prior art. In accomplishing this objective, the present invention has several uses and advantages. One use is for traffic mitigation. It is well known that individual driver reaction time is a major factor in determining the number of vehicles per hour that is able to pass a fixed point on a freeway or a traffic-light-controlled intersection. If all vehicles are cooperatively paired up, the number of individual reaction times is halved (the trailing vehicles effectively have no driver to react). Hence, the number of vehicles per hour would increase substantially, thereby permitting existing roadways to carry more traffic. Specifically, it is estimated that a 60% improvement over present traffic density may be achieved with a 2 foot separation.

A second independent use of the invention would be vehicle delivery. Once two vehicles are cooperatively paired, no operator is required in the trail vehicle Hence, the paired vehicles could be driven to a destination by a single operator. This would be economically beneficial for delivery of new or rental cars, or for returning a car from servicing. Clearly delivering two cars with one driver is less expensive than requiring a driver for each car.

One advantage of using the present invention's system would be a full savings for the trail vehicle. The drafting effect, i.e. the reduction of wind resistance caused by the lead vehicle, is well known by racing drivers. If the distance between the vehicles is small and the aerodynamics well thought out, the drafting effect could save 25 percent or more in fuel costs.

SUMMARY OF THE INVENTION

The new system that I propose requires only equipment that may be retrofitted onto existing motor vehicles. Thus, the present invention works with current streets and freeways, and therefore no publicly owned equipment needs to be built or operated. A vehicle equipped with the invention can be operated manually as a conventional motor vehicle and can then, under command of its operator, switch into a mode called "Tow Mode."

The onboard equipment required for Tow Mode consists of mechanisms for vehicle longitudinal control, e.g., acceleration, speed maintenance, and braking; lateral control, e.g., steering; and communication, position sensing, and logical computer equipment. Both lead and trail cars should be identically equipped, as either vehicle may be required to take on lead or trail roles.

Tow Mode requires at least two vehicles; each may have their own operators. The front vehicle, or lead vehicle, needs to be driven by an operator during Tow Mode. The rear vehicle, or trailing vehicle, is controlled by the lead vehicle and mimics all the motions of the lead vehicle. The operator of the trailing vehicle does not drive but simply waits passively while being towed. He/she resumes driving when Tow Mode is terminated.

Tow Mode is initiated by a trailing vehicle which interrogates ahead vehicle through its communication system. The communication system automatically trades vehicle identification codes as well as static vehicular performance characteristics. The logical computer system then determines whether the trail car is compatible performance-wise with the lead car in terms of its being "towed" in Tow Mode. If the computer judges the two cars compatible, Tow Mode may begin with both vehicles becoming "joined" by each of their communications channel and onboard sensors. At that point, both vehicles are then driven by the actions of the operator in the lead vehicle. The onboard sensors continually detect the actual driving performance of the lead driver, the actual performance characteristics of both vehicles, and the relative positions of the two vehicles The computer system monitors this incoming data and controls the two vehicles so that the trail vehicle is able to safely mimic the lead vehicle. When Tow Mode ends, the vehicles separate and are driven off independently by their respective drivers. At no time do the vehicles need to be physically joined.

What is new and inventive therefore is the concept that vehicles in Tow Mode are being cooperatively driven by the human operator of the lead vehicle with the performance characteristics of all cars being accounted for. Also inventive is the logic, computer software, and operator control panel needed to use Tow Mode safely and effectively. Also inventive are the needed sequences for beginning and ending Tow Mode.

DESCRIPTION OF THE PREFERRED EMBODIMENT

The following description is of the best presently contemplated mode of carrying out the present invention. This description is not to be taken in a limiting sense;.it is made merely for the purpose of illustrating the general principles of the invention since the scope of the invention is best defined by the appended claims.

Figure 1:
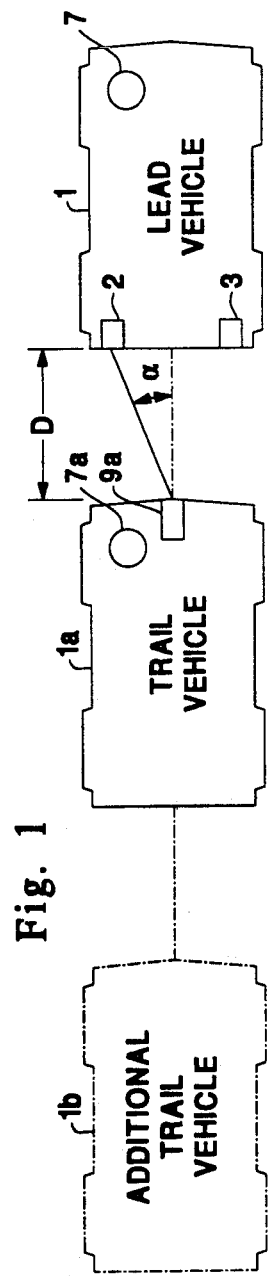
FIG. 1 is a prospective view of the present invention's system.

As shown in FIG. 1, the present invention is preferably used for the cooperative driving of two vehicle. The present invention, however, may also be extended to include additional vehicles as also indicated in FIG. 1.

Figure 3B:
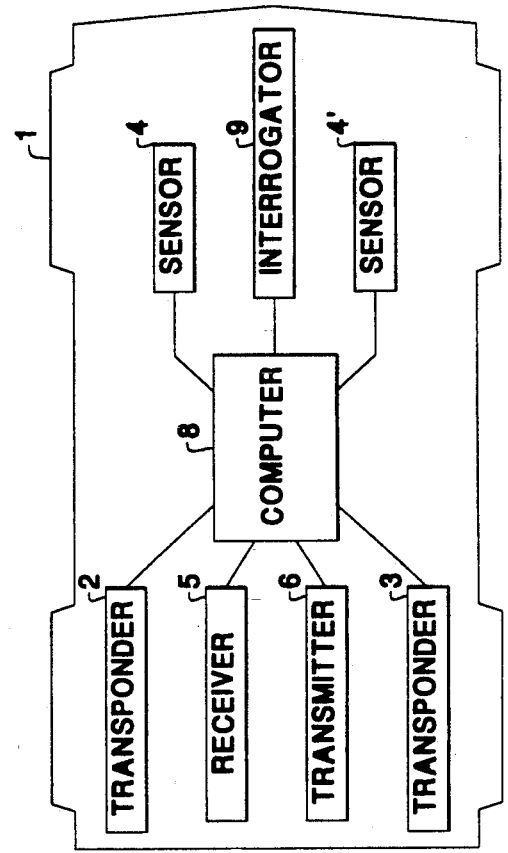
FIG. 3b shows the lead vehicle's hardware for use in the present invention's system.
Figure 3A:
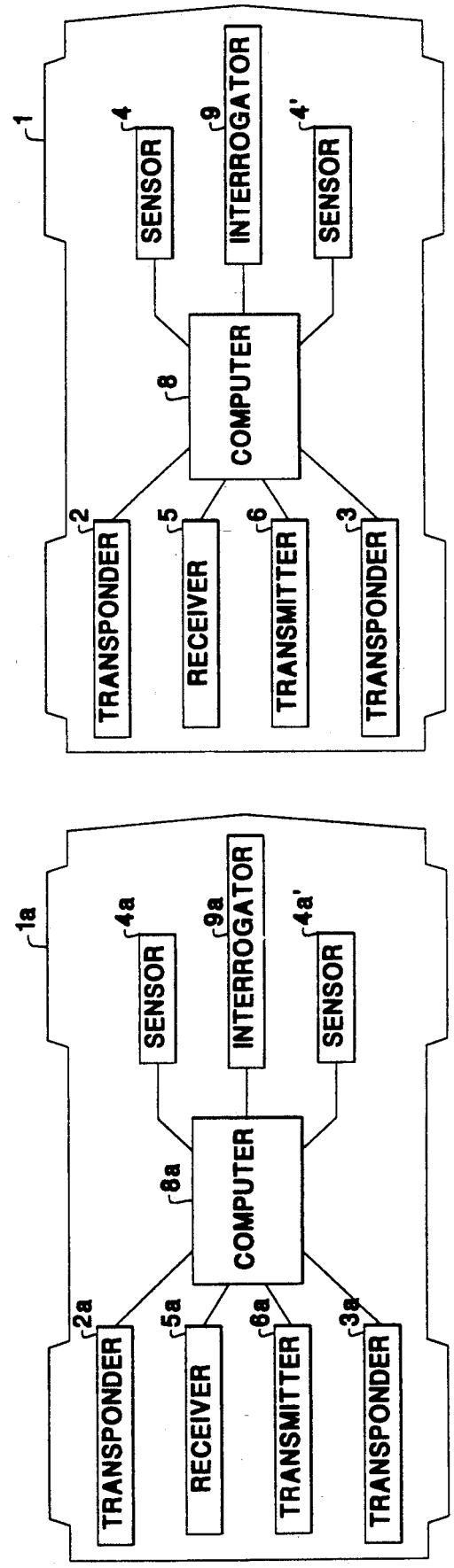
FIG. 3a shows the trailing vehicle's hardware for use in the present invention's system.

In accordance with the preferred embodiment, cars 1,1a are identically equipped, as shown in FIGS. 3a and 3b, so that either car may assume lead or trail roles. For example, cars 1,1a are equipped with communication means, which typically comprise receivers 5,5a and transmitters 6,6a.

In addition, cars 1,1a are each equipped with means for controlling their respective steering, braking and acceleration. Typically, this control means includes computers 8,8a, which also serve as judging means for evaluating performance and operator data from, both cars 1,1a. As will be explained below, a vehicle's performance and operator data is accumulated by various sensors and may be transferred to another vehicle by the communication means.

Certain data fed to computers 8,8a is accumulated by transponders 2,2a, 3,3a, located at the rear of each car. These transponders provide such information as a vehicle's identification code (ID), a separation distance between two vehicles (D), and an offset angle between the two vehicles ($\alpha$). The above information is provided to vehicle 1a when transponders 2, 3 are interrogated by interrogator 9a. In accordance with the preferred embodiment, an identical interrogator 9 is located on car 1.

Other information fed to computers 8,8a are accumulated by various sensors. For example, sensors 4,4a monitor operators' 7,7a driving responses by detecting acceleration pedal pressure, brake pedal pressure, and steering wheel rotation. In addition, sensors 4',4a' monitor actual vehicle performance with respect to acceleration, velocity, braking (decelerations) and turning. This vehicle performance data also includes-lag times in the mechanical systems, an example of which is the lag between the application of pressure at the accelerator to the time acceleration begins. This acceleration lag or delay can be substantial since it cumulatively comprises the additive delays from the fuel delivery system, the combustion chamber, the crank shaft inertia, and the transmission. The performance data from sensors 4',4a' is then stored in memories of computers 8,8a so as to maintain an updated record on the vehicle's performance capabilities, e.g., acceleration, braking and steering capabilities.

The present invention will be best understood in the context of its preferred mode of operation. As discussed in the following sections, there are four distinct phases of operation with respect to the present invention. Reference should be concurrently made to FIGS. 2, 4, and 5 for a better understanding of the invention.

Figure 2:
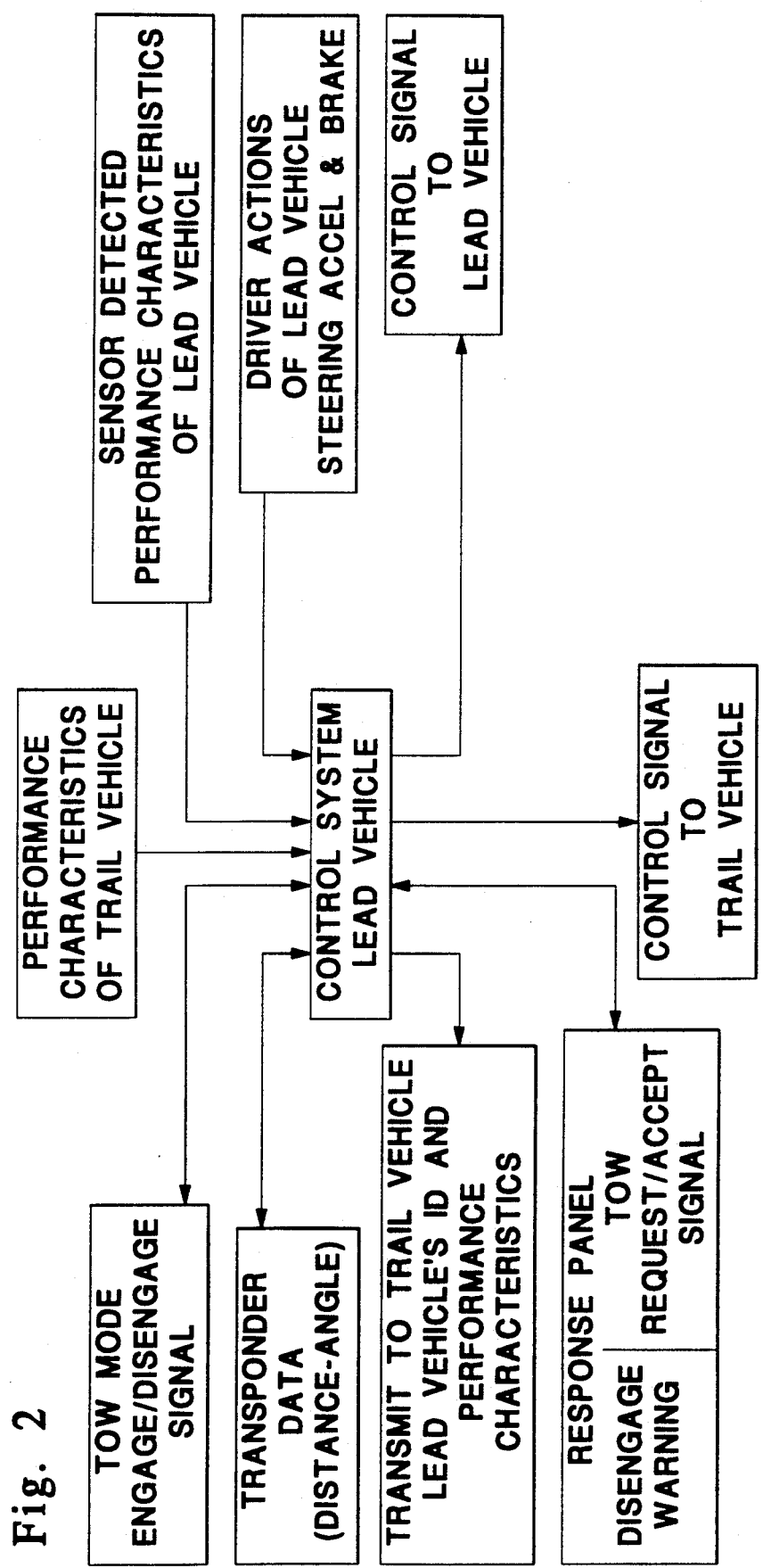
FIG. 2 shows various types of data being inputted to and outputted out of the control system of a lead vehicle.
Figure 4:
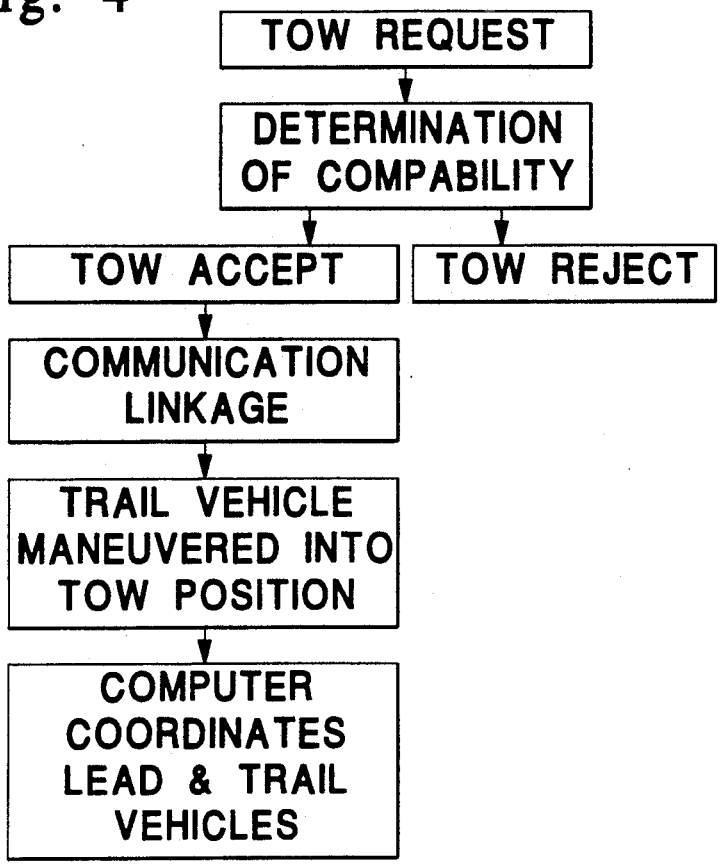
FIG. 4 is a flow chart of the present invention's operation when initiating, establishing and operating in tow mode.
Figure 5:
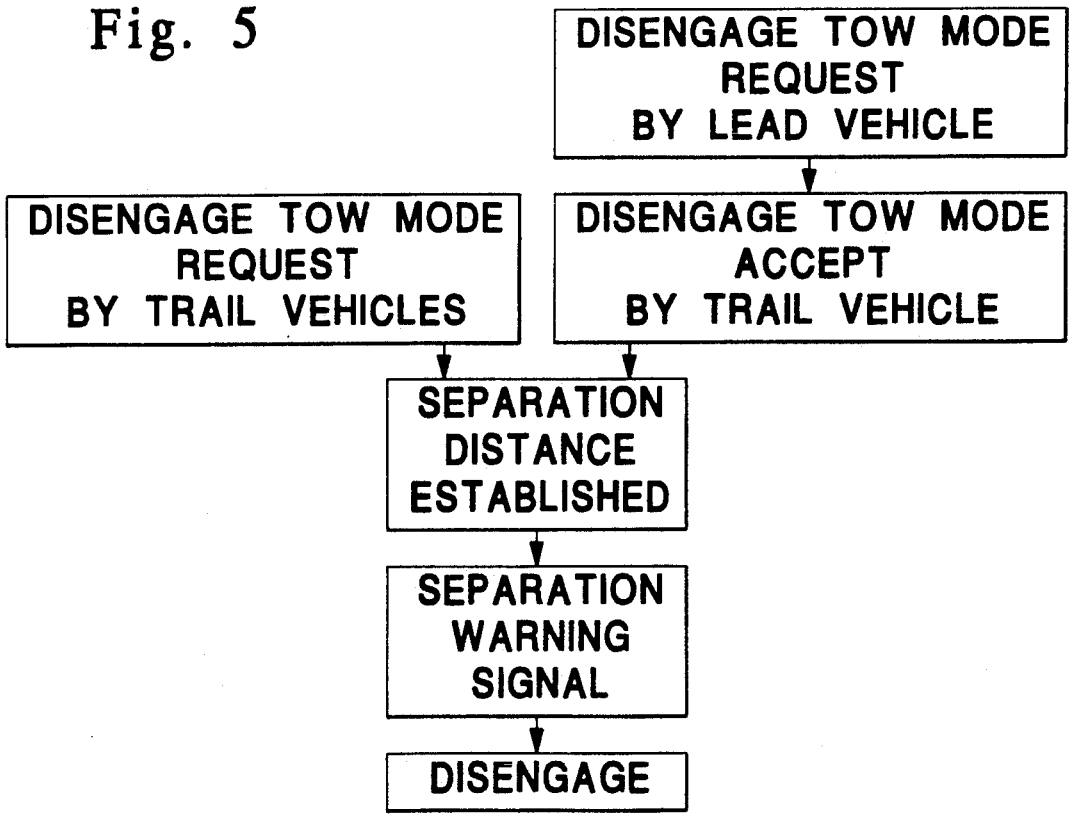
FIG. 5 is a flow chart of the present invention's operation when disengaging from tow mode.

FIGS. 4 and 5 are simplified flow charts of the four phases of operation. FIG. 2 shows the control system of the lead vehicle and the various types of information being exchanged between the two vehicles via their communication means. Note that incoming arrows into the lead vehicle's control system indicates incoming information transmitted from the trail vehicle. Outgoing arrows indicate information being transmitted to the trail vehicle. Incoming and outgoing arrows indicate that that information is exchanged between the two vehicles. Conversely, a similar figure may be drawn for the trail vehicle's control system except that the arrows will be reversed in direction. These figures are not to be read as limiting since the present invention encompasses other embodiments not illustrated in these figures.

Initiating Tow Mode

In the first phase, which is the initiation mode, driver 7a of vehicle 1a initiates a "tow request" signal, preferably by pushing a button on his/her dash. By pressing the "tow request" button, driver 7a causes interrogator 9a to interrogate transponders 2,3 of vehicle 1. Transponders 2,3 then feed back to computer 8a of vehicle 1a a variety of information to determine whether the second phase of operation, tow mode, should be established. This information preferably includes both the separation distance, D, between the-two vehicles and their respective offset angle, $\alpha$. Computer 8a then determines whether vehicle 1 and 1a are properly positioned for tow mode. If not, a display may indicate what operator 7a needs to do to position vehicle 1a properly. In addition, the transmitted information from vehicle 1 preferably includes vehicle 1's vehicle identification code, e.g., a license plate number, which is displayed to operator 7a to permit him/her to ascertain whether the correct lead vehicle is being interrogated. Furthermore, the transmitted information preferably includes vehicle 1's current performance characteristic, e.g., its acceleration, braking and steering capability. Vehicle 1's performance characteristics are compared with vehicle 1a's performance characteristics to determine whether the two vehicles are compatible for establishing tow mode. This determination is preferably based on pre-established safety factors stored in memories of computers 8,8a.

If the two vehicles are judged incompatible, a display so informs operator 7a and tow mode is precluded from being established. If the two vehicles are judged compatible, a compatibility signal is transmitted to vehicle 1, which is displayed to operator 7 as a "tow request". Either computers 8 or 8a may serve as the judging means for compatibility.

A judgment of compatibility is preferably not based on the two vehicles sharing identical performance characteristics. In reality, few vehicles, if any, are exactly alike in terms of steering, braking, and accelerating capabilities. In accordance with this preferred embodiment, computers 8 or 8a may warn lead operator 7 of any needed modifications in his/her vehicle's performance responses to his/her driving actions in order to mesh the two vehicle's performance characteristics safely for cooperative driving. In other words, operator 7 may be warned that his/her vehicle's braking, acceleration, or steering responses have been modified to accommodate trailing vehicle 1a's poorer performance characteristics. These potential modifications will be further discussed in the section on "Operating in Tow Mode."

Operator 7 preferably has the option of accepting or rejecting the tow request. If operator 7 chooses to reject the tow request, he/she may initiate a refusal signal which is transmitted to operator 7a. If operator 7 wishes to accept the tow request, he/she may initiate a tow accept signal which is similarly transmitted to operator 7a.

The above description of the invention's operation is illustrated by FIG. 4's flow chart. The above description and the illustration is not to be read as limiting. Other variations of initiating "tow mode" come within the scope of the invention.

Establishing Tow Mode

After operator 7a's tow request has been accepted, vehicles 1,1a become "linked" through their communication means. Once linkage is established, operator 7a relinquishes control of vehicle 1a to operator 7. Operator 7a may then take his/her hands off the steering wheel and his/her feet off the foot controls of vehicle 1a. In other words, vehicle 1a becomes unresponsive to operator 7a's driving action. However, as will be explained later, operator 7a may disengage from "tow mode" by stepping on vehicle 1a's brakes.

After linkage is established, computer 8 of vehicle 1 drives one of the two vehicles, bringing them together to a predetermined proper tow position, preferably within a car length. For example, with a 2 foot separation and a 0 degree offset angle between the two vehicles, it is estimated that a 60% improvement over present traffic density may be achieved. Preferably, computer 8 accelerates and steers trailing vehicle 1a so that the desired separation distance and offset angle is achieved. Alternatively, computer 8 may slow down lead vehicle 1 to achieve the desired separation distance.

The above description of the invention's operation is illustrated by FIG. 4's flow chart. The above description and the illustration is not to be read as limiting. Other variations of establishing tow mode come within the scope of the invention.

Operating in Tow Mode

In accordance with the preferred embodiment, computer 8 maintains control over trailing vehicle 1a so that it remains in the proper predetermined tow position behind lead vehicle 1. During this towing operation, computer 8 is fed instantaneous information regarding operator 7's driving actions through sensors 4. Computer 8 receives this information before vehicle 1 responds to operator 7's actions. Computer 8 has also been fed, via the communications link established with vehicle 1a, information regarding trailing vehicle 1a's current performance characteristics. Computer 8 then judges whether vehicle 1a may safely mimic operator 7's desired driving action, e.g., braking, acceleration, and steering. If the maneuver is judged safe, vehicle 1 is permitted to respond normally to operator 7's driving action. If the maneuver is judged unsafe, computer 8 modifies the performance response of vehicle 1 to safely permit the maneuver for both vehicles. For example, a typical case may involve a situation where lead vehicle 1 has a superior braking capitulatory over trailing vehicle 1a. In the event that lead operator 7 slams on his/her brakes, vehicle 1a may collide into vehicle 1 since it is unable to stop as quickly. Consequently, in accordance with the present invention's preferred embodiment, computer 8 modifies the braking response of lead vehicle 1 in order to permit trailing vehicle 1a to brake safely, e.g., reduces the braking response of vehicle 1. As mentioned earlier, lead operator 7 has been preferably warned on his/her display of this reduced braking capability at the time tow mode was initiated.

The above description of the invention's operation is illustrated by FIG. 4's flow chart. The above description and the illustration is not to be read as limiting. Other variations of operating in tow mode come within the scope of the invention. For example, instead of computer 8 of the lead vehicle, computer 8a of the trailing vehicle may be used for judging and for controlling the driving of the two vehicles in accordance with the performance characteristics of the vehicles and the lead driver's driving action to achieve safe cooperative driving.

Disengaging from Two Mode

In accordance with the preferred embodiment, tow mode may be disengaged by either operator 7 or 7a. If operator 7a of trailing vehicle 1a wishes to disengage, he/she initiates a "tow mode" disengage signal. This causes computer 8a to resume control of vehicle 1a. Computer 8a increases the separation between the two vehicles by slowing down vehicle 1a. During this separation vehicle 1a should remain in tow mode. Once a safe separation distance has been established, mainitiates a warning signal to operator 7a to resume manual control of vehicle 1a. After several seconds of warning, computer 8a relinquishes control over vehicle 1a back to operator 7a. Alternatively, operator 7a may initiate a tow mode disengage signal by stepping on vehicle 1a's brakes. In that case, the disengage operation preferably remains the same as described above.

In the event that operator 7 of lead vehicle 1 wishes to disengage, he/she initiates a "tow mode" disengage signal to operator 7a. Preferably, disengagement occurs only when operator 7a affirmatively responds by initiating a "tow mode" disengage accept signal. This safety feature prevents operator 7 from unilaterally disengaging tow mode and catching operator 7a unawares. Disengagement occurs as described above. In the event that operator 7 wishes to unilaterally disengage from tow mode, he/she preferably feeds to first bring both vehicles to a fully stopped position.

The above description of the invention's operation is illustrated by FIG. 5's flow chart. The above description and the illustration is not to be read as limiting. Other variations of disengaging from tow mode come within the scope of the invention.

The above description of the presently preferred embodiment of the invention was intended to illustrate by way of example the novel features that are believed to be characteristics of the present invention. It is to be expressly understood, however, that the specific embodiment is for the purpose of illustration and description only and is not intended as a definition of the limits of the invention.

Other possible embodiments of the invention are included within the scope of the invention. For example, a natural extension of the present invention allows additional trail vehicles to follow the lead vehicle. In an example where there is one additional trail vehicle 1b, as shown in FIG. 1, that vehicle would initiate tow mode by interrogating vehicle 1a. As with the two-car situation, transponders in vehicle 1a transmit to vehicle 1b information with respect to vehicle 1a's separation distance, offset angle, and vehicle identification. Preferably, vehicle 1's and vehicle 1a's performance characteristics are compared to those of vehicle 1b to determine their overall compatibility. If overall compatibility exists, a "tow request" is preferably displayed to vehicle 1's operator, which he/she may accept. Additionally, a "tow request" may be displayed to vehicle 1a's operator, which he/she may accept. Once the tow request is accepted, tow mode is established and operated similarly as in the earlier described two-car situation. The above description of initiating tow mode is not to be read as limiting. For example, vehicle 1b' performance characteristics may just be compared to those of the lead vehicle's to determine compatibility.

Disengaging from tow mode in a train of 3 or more vehicles is also somewhat similar to the two-car situation. If the lead car wishes to disengage from tow mode, preferably operators of both trailing vehicles must affirmatively respond. If vehicle 1a wishes to disengage, an affirmative response is preferably only required from vehicle 1b. On the other hand, vehicle 1b may unilaterally disengage, preferably leaving vehicles 1 and 1a remaining in tow mode. Thus, in this preferred embodiment, a disengaging vehicle must have first received an affirmative response from all the vehicles trailing it, and in disengaging, it leaves the vehicles in front of it remaining in tow mode. Alternatively, the disengaging vehicle may assume a new leading role, "towing" the vehicles trailing it. The actual operation of tow mode is nearly similar to that of the earlier described two-car situation except that a further warning may be displayed to the lead operator with respect to any additional modifications of the lead vehicle's performance characteristics.

In accordance with the above described preferred embodiment of the invention, a train of 3 or more vehicles could still be driven by a single operator in the lead vehicle. All that is required is additional driver training in maneuvering a train of cars. Furthermore, the number of vehicles in the train may be increased if sub-compact vehicles are cooperatively joined. Consequently, traffic efficiency would be further enhanced by such trains and the economics of vehicle delivery would be even greater than in the two-car case.

Also within the scope of the present invention are methods of safely going between operator mode and Tow Mode while in a stream of traffic. One suggested way of beginning and ending Tow Mode was manual entry where the drivers determine the beginning and ending of Tow Mode. Another possible way is semiautomatic entry, where towing is begun automatically at each stopping place whenever the preceding vehicle is deemed compatible. The trail vehicle is then towed until a certain speed is reached, say 25 mph, or until it clears the intersection, at which point it is automatically released from the tow. The semiautomatic mode would proceed without operator intervention and would be useful during street driving for efficiently passing through a series of traffic lights or stop signs, or for efficiently turning at intersections.

The above suggestions are not to be read as limiting and any other methods of entering and ending Tow Mode, or of utilizing the present invention are included within the scope of the invention.

Furthermore, the hardware used in the present invention may also be easily adapted for use in an automatic highway system whereby a vehicle is controlled by an external central computer. In those cases, a communication link will be established between the external computer and a vehicle for inputting the vehicle's positonal information and performance characteristics. The external computer instead of the lead vehicle may then appropriately control the driving of the vehicle through its driving control means.

The concept of the automatic highway system is not to be read as limiting. Other embodiments whereby an external computer controls a vehicle's actions are within the scope of the present invention. For example, the scope of the present invention includes an automatic parking system whereby an external computer controls the driving of a vehicle within a parking garage so as to automatically park the vehicle without an operator.

What is claimed is:

1. A system for the cooperative driving of two vehicles, a leading vehicle and a trailing vehicle, said trailing vehicle behind said leading vehicle but not physically connected thereto, comprising
   data acquisition means, in said trailing vehicle, for acquiring performance capabilities from said leading vehicle, and
   cooperative driving means, in said trailing vehicle, for driving said trailing vehicle in response to said acquired performance capabilities.

2. A system according to claim 1 further comprising means for modifying said performance capabilities of said leading vehicle so that said performance capabilities of said leading vehicle are compatible with the performance parameters of said trailing vehicle 3. A system according to claim 1 wherein said data acquisition means in said trailing vehicle acquires data communicated from said leading vehicle without wire connection, said acquired data further including relative positional information of said leading vehicle; and said cooperative driving means adjusting the performance of at least one of said leading and trailing vehicles in accordance with said acquired data for compatible cooperative driving between said vehicles.

4. In a cooperative driving system in which at least one trailing car is driven cooperatively by a transmitted signal from a leading car, including:
   means in said leading car for sensing driver action therein, and
   means in said leading car for adjusting the performance response of said leading car to said driver action in accordance with the performance capabilities the trailing car, so that the performance of said leading car is modified so as to not to exceed the performance of said trailing car.

5. In a cooperative driving system in which at least one trailing car is driven cooperatively by a transmitted signal from a leading car, including:

means in said trailing car for sensing driver action of said leading car and means in said trailing car for adjusting the performance response of said trailing car to said driver action in, accordance with the performance capabilities of the leading car, so that the performance of said trailing car is modified so as not to exceed the performance of said leading car.

6. A method for the cooperative driving of two vehicles, a leading vehicle and a trailing vehicle, said trailing vehicle being behind said leading vehicle but not physically connected thereto, comprising the steps of:

acquiring performance capabilities from said leading vehicle, and cooperatively driving said trailing vehicle in response to said acquired performance capabilities.

7. A method according to claim 6 further comprising the step of modifying said performance capabilities of said leading vehicle so that said performance capabilities of said leading vehicle are compatible with the performance capabilities of said trailing vehicle.

8. A method according to claim 6 wherein the step of acquiring performance capabilities from said leading vehicle further includes the step of acquiring relative positional information of said leading vehicle.

9. A method according to claim 6 wherein the step of acquiring performance capabilities from said leading vehicle further includes the step of acquiring the time between initiation of a vehicle action by the driver of said leading vehicle and the response of said leading vehicle to that action.

* * * * *